United States Patent [19]

Watanabe et al.

[11] Patent Number: 4,770,813

[45] Date of Patent: Sep. 13, 1988

[54] PROCESS FOR PREPARING STABLE COLLOIDAL SOLS OF ANTIMONY PENTOXIDE IN ORGANIC SOLVENTS

[75] Inventors: Yoshitane Watanabe, Tokyo; Keitaro Suzuki; Masayuki Teranishi, both of Funabashi, all of Japan

[73] Assignee: Nissan Chemical Industries, Ltd., Tokyo, Japan

[21] Appl. No.: 934,402

[22] Filed: Nov. 24, 1986

[30] Foreign Application Priority Data

Nov. 29, 1985 [JP] Japan .................. 60-269082

[51] Int. Cl.$^4$ .................. B01J 13/00; C09K 2/10
[52] U.S. Cl. .................. 252/309; 252/610; 252/314
[58] Field of Search .................. 106/18.28, 287.18; 252/184, 309, 610, 314

[56] References Cited

U.S. PATENT DOCUMENTS

| | | | |
|---|---|---|---|
| 3,657,179 | 4/1972 | Yates | 106/18.27 X |
| 3,994,825 | 11/1976 | Crompton et al. | 252/309 |
| 4,017,418 | 4/1977 | Crompton et al. | 106/18.27 X |
| 4,026,819 | 5/1977 | Langere et al. | 252/309 X |
| 4,028,266 | 6/1977 | Langere et al. | 252/309 X |
| 4,051,069 | 9/1977 | Crompton et al. | 252/309 |
| 4,059,540 | 11/1977 | Crompton et al. | 252/309 |
| 4,110,247 | 8/1978 | Gower, II et al. | 252/313.1 |
| 4,348,301 | 9/1982 | Crompton et al. | 252/313.1 |
| 4,576,921 | 3/1986 | Lane | 252/313.1 X |
| 4,589,997 | 5/1986 | Watanabe et al. | 106/18.28 X |

FOREIGN PATENT DOCUMENTS

| | | | |
|---|---|---|---|
| 41536 | 3/1985 | Japan | 252/309 |
| 161731 | 8/1985 | Japan | 252/309 |
| 161730 | 8/1985 | Japan | 252/309 |
| 161729 | 8/1985 | Japan | 252/309 |

*Primary Examiner*—Matthew A. Thexton
*Attorney, Agent, or Firm*—Frishauf, Holtz, Goodman & Woodward

[57] ABSTRACT

There is disclosed a process for preparing stable colloidal sols of antimony pentoxide in organic solvents which comprises the steps of adjusting an amount of an organic base in an aqueous colloidal solution of antimony pentoxide to, in terms of % by weight, 2 to 30% based on antimony pentoxide in the aqueous colloidal solution of antimony pentoxide; adding an organic acid in an amount of 0.2 to 20%; and replacing a dispersing medium of the colloidal solution from water to an organic solvent.

10 Claims, No Drawings

PROCESS FOR PREPARING STABLE COLLOIDAL SOLS OF ANTIMONY PENTOXIDE IN ORGANIC SOLVENTS

BACKGROUND OF THE INVENTION

This invention relates to a process for preparing stable colloidal sols of antimony pentoxide in organic solvents (hereinafter referred to as "antimony pentoxide organosol"). More particularly, it relates to a novel process for preparing an antimony pentoxide organosol by processing an aqueous antimony pentoxide sol with an organic base and an organic acid and then replacing the dispersing medium of the sol from water to organic solvents.

The antimony pentoxide sol is used as an auxiliary of a flame retardant for plastics, fibers, etc.; as a microfiller for surface treatment for plastics, glasses, etc.; as an inorganic ion exchanger to remove a metallic ion; and the like.

At present, high concentration aqueous sol ($Sb_2O_5$ content of 30 to 50% by weight and pH of 4 to 8) stabilized with an organic base has generally been used. However, the aqueous sol is used only with water or a hydrophilic organic solvent such as N,N-dimethylformamide (hereinafter referred to as "DMF") and alcohols, whereby its use is remarkably limited.

In recent years there has been an increased demand for methods of imparting flame retardancy to materials and especially polymers. This demand has been met using antimony pentoxide sols including sols in both hydrophilic organic solvent and hydrophobic organic solvents.

As the conventional processes for preparing the antimony pentoxide organosol, there are known (1) a method in which anhydrous antimony trioxide or antimony trichloride is added to nitric acid and after heating, α-hydroxycarboxylic acid is added thereto, then an organic solvent such as DMF is added thereto and water is removed by evaporation (U.S. Pat. No. 3,657,179); (2) a method in which to a monovalent or divalent or more of alcohols to be represented by ethylene glycol is added to a hydrogen halide such as hydrogen chloride, hydrophilic organic solvent such as DMF and α-hydroxycarboxylic acid to disperse antimony trioxide, and then oxidizing it with an aqueous hydrogen peroxide solution (U.S. Pat. Nos. 4,051,064 and 4,017,418); (3) a method in which antimony pentoxide sol, which was obtained by the method of oxidizing antimony trioxide with an aqueous hydrogen peroxide solution and stabilized with amine, is dried and pulverized, and then the powder is dispersed in an organic solvent such as DMF (U.S. Pat. No. 4,026,819); and (4) a method for preparing an aqueous sol stabilized with a combination of alkanol amine and α-hydroxycarboxylic acid, and phosphoric acid, etc. (U.S. Pat. No. 4,348,301) wherein there is disclosed that the aqueous sol obtained by this method is mutually soluble with a hydrophilic organic solvent (e.g., methanol, DMF, etc.).

The conventional methods as mentioned above are each limited to an organic solvent which has extremely high hydrophilic nature miscible with water at optional ratio. Also, since the antimony pentoxide organosols obtained by these methods contain extremely large amounts of α-hydroxycarboxylic acid (e.g., malic acid) or hydrohalogenic acid (hydrochloric acid), when they were added to the polymer for fibers to give flame resistance, problems such as lowering in physical properties of a polymer or corrosion of a recovery device due to particularly halogen on recovery of an organic solvent by evaporation after spinning are present.

An example of using a hydrophilic organic solvent organoantimony pentoxide sol is for flame resistant finishing of a polymer of acrylic fibers, or for microfillers in order to give a flame retardant property or increase a surface hardness to an alcohol solution of a silicone resin which has been used as a surface treatment for plastic films glasses, etc.

In U.S. Pat. No. 4,348,301 as mentioned above, it is possible to prepare a hydrophilic organic solvent sol in combination of alkanol amine and α-hydroxycarboxylic acid, and phosphoric acid, etc., but it cannot be used with a hydrophobic or non-aqueous organic solvent. Further, in U.S. Pat. No. 4,026,819, there is proposed a method in which an aqueous sol stabilized with an aliphatic amine, cyclic amine, etc. is prepared and dried, and the obtained powder is then dispersed in an organic solvent such as DMF to prepare an organosol. However, the organosol obtained by the method is unstable, and by this method, an organosol of a hydrophobic organic solvent such as toluene, etc. cannot be obtained.

In recent years, there are proposed methods in which antimony pentoxide is dispersed in a hydrophobic solvent by using a specific anionic surface active agent or nonionic surface active agent (Japanese Provisional Patent Publications Nos. 161729/1985, 161730/1985 and 161731/1985). However, these methods result in a great deal of aggregation of particles at a high concentration to thereby forming a slurry or gel. Therefore it is difficult to obtain an antimony pentoxide organosol using a hydrophobic solvent with low viscosity and high concentration. Further, the product having high concentration obtained by the method has disadvantage that change in color will sometimes occur with time.

SUMMARY OF THE INVENTION

The present inventors have made intensive studies on removal of the above-mentioned conventional disadvantages and the preparation of antimony pentoxide sols in a hydrophilic or hydrophobic solvents which is stable and high concentration in order to satisfy the present demand, and as a result, they have accomplished the present invention.

That is, the present inventors have found that the intended antimony pentoxide organosol can be obtained by the method of using an aqueous sol which has been obtained by the conventionally known method and replacing water as a dispersing medium with an organic solvent, and they have accomplished the present invention.

An object of the present invention is to provide a process for preparing stable and high-concentration antimony pentoxide organosol using a hydrophilic or hydrophobic organic solvent as a dispersing medium with low cost.

The process for preparing a stable antimony pentoxide organosol of the present invention comprises adjusting an amount of an organic base in an aqueous sol of antimony pentoxide to, in terms of % by weight, 2 to 30% based on antimony pentoxide in the aqueous sol of antimony pentoxide; adding an organic acid in an amount of 0.2 to 20%; and replacing a dispersing medium of the sols from water to an organic solvent.

DESCRIPTION OF THE PREFERRED EMBODIMENTS

In the present invention, "adjusting an amount of an organic base in an aqueous antimony pentoxide sol" means that in case where the aqueous sol contains no organic base, the predetermined amount of an organic base is added to the aqueous sol. On the other hand, in case where the aqueous sol contains any amount of an organic base, deficient amount of the organic base is added to the aqueous sol, or after removing the organic base contained therein, the predetermined amount of other organic base may be added therein.

The organic solvent used in the present invention can be divided into two types due to properties thereof, one of which is a hydrophilic organic solvent and the other is a hydrophobic organic solvent.

As the hydrophilic organic solvent, there may be mentioned, for example, acid amides represented by DMF, N,N'-dimethylacetamide and N-methyl-2-pyrrolidone; lower alcohols such as methanol, ethanol, etc; polyvalent alcohols such as ethylene glycol, etc.; glycol ethers such as diethylene glycol monoethyl ether, etc.; cyclic ethers such as tetrahydrofuran, etc.; and others such as dimethylsulfoxide, etc.

As the hydrophobic organic solvent, there may be mentioned aromatic hydrocarbons represented by benzene, toluene, xylene, or solvent naphtha which mixtures of the above; aliphatic hydrocarbons or alicyclic hydrocarbons represented by hexane, kerosine and cyclohexane; esters represented by ethyl acetate and dioctylphthalate; halogenated hydrocarbons such as carbon tetrachloride, chloroform, trichloroethylene, chlorobenzene, etc; ketones such as methyl ethyl ketone, etc.; and ethers such as diethyl ether, etc.

As the organic base to be used in this invention, there may be mentioned aralkyl amines such as benzylamine and phenethylamine; aliphatic amines such as propylamine, dibutylamine, n-octylamine and diethylenetriamine; alicyclic amines such as piperidine; alkanol amines such as monoethanolamine and triethanolamine; aromatic amines such as aniline, etc.; and these amines may be used in combination.

As the organic acid to be used in this invention, alkylbenzenesulfonic acids or alkylnaphthalenesulfonic acids each having $C_1$ to $C_{15}$ alkyl group; alkylsulfonic acids having $C_4$ to $C_{18}$ alkyl group; alkylsulfates and alkylpolyoxyethylenesulfates (ethyleneoxide added mole number: 1 to 5) each having $C_4$ to $C_{18}$ alkyl group; mono-or dialkylphosphates, mono- or diarylphosphates, alkylarylphosphates and polyoxyethylene adducts of the above phosphates (GAFAC, trade name, produced by Toho Kagaku Co., Ltd.); monocarboxylic acids having 3 to 12 carbon atoms; aliphatic dicarboxylic acids such as oxalic acid, malonic acid and maleic acid; hydroxycarboxylic acids such as lactic acid, tartaric acid, citric acid, gluconic acid and mandelic acid; aromatic carboxylic acids such as phthalic acid and trimellitic acid; and acids having sulfonyl group and carboxyl group in the structure such as sulfosalicylic acid and sulfosuccinic acid. These organic acids may be used in combination therewith.

The aqueous antimony pentoxide sol to be used in this invention may be a sol prepared by the conventionally known method. As known methods for preparing an aqueous antimony pentoxide sol, there may be mentioned the method in which potassium antimonate is deionized (Japanese Patent Publication No. 11848/1982); the method in which sodium antimonate is deionized (U.S. Pat. No. 4,110,247); the method in which antimony oxide is oxidized with hydrogen peroxide at a high temperature (Japanese Patent Publication No. 20479/1978 and Japanese Provisional Patent Publication No. 21298/1977); or the method in which an antimony pentoxide gel obtained by the reaction of sodium antimonate and an acid is peptized by use of an amine (Japanese Provisional Patent Publication No. 41536/1985 which corresponds to U.S. Pat. No. 4,589,997 proposed by the present inventors). Further, there is the method in which an antimony pentoxide gel obtained by the reaction of sodium antimonate and an acid is peptized by use of phosphoric acid (Japanese Patent Application No. 70719/1985 proposed by the present inventors).

In case where these aqueous antimony pentoxide sols are stabilized in advance with an organic base such as monoethanolamine, triethaolamine, etc., they may be used as they were, while in case where said organic base to be used in this invention as mentioned above is different from the base contained therein, for example, benzylamine, etc. is employed, it is preferred in advance to remove the organic base contained in the aqueous antimony pentoxide sol. As the method of removing the organic base in an aqueous sol, there may be mentioned the method of treating the aqueous sol with a cation exchange resin.

Further, in the method of preparing the aqueous antimony pentoxide sol of the present inventors as mentioned above by peptizing the antimony pentoxide gel with amine (U.S. Pat. No. 4,589,997), the aqueous sol may be prepared by peptizing an amine to be employed for the organosol.

An alkali content of the aqueous antimony pentoxide sol to be used in this invention may be in the molar ratio of $M_2O/Sb_2O_5$ (where M is Na or K) of 0 to 0.8. While, the molar ratio of $M_2O/Sb_2O_5$ cannot be obtained only in the range of 0 to 0.5 by the conventional method as mentioned above, the range of this invention can be adjusted by adding an alkali hydroxide to the sol having the above molar ratio, or subjecting a heat treatment after addition of alkali antimonate salt.

The aqueous antimony pentoxide sol to be used in this invention may preferably be used those having a $Sb_2O_5$ concentration of 2 to 40% by weight. In case the concentration is less than 2% by weight, efficiency of separation is small, while in excess of 40% by weight may be possible, the viscosity becomes too high whereby stirring becomes difficult thus it is not preferable. The particle sizes thereof may range from 5 to 100 m$\mu$.

The order of addition of the above organic base and the organic acid is not particularly limited, but it may be the order of the base and acid. As the amounts of the organic base and the organic acid to be added, as to the organic base, it may ranges, in terms of % by weight, from 2 to 30%, preferably 3 to 20%, based on $Sb_2O_5$, while as to the organic acid, it may ranges, in terms of % by weight, from 0.2 to 20%, preferably 0.5 to 18%, based on $Sb_2O_5$. If these amounts are less than the above range, unpeptized products become large. On the other hand, if the organic base is in excess of the above range, pH becomes high while if the organic acid is in excess of the above range, pH becomes low, in such case, decomposition of the solvents sometimes occur depending upon the kind of the solvents. Further, if the peptization is effected, dispersibility of a colloid of an antimony pentoxide is bad so that unpeptized products become large. If both of the organic base and the organic acid are in excess of the above range, while the peptized sol can be obtained, undesirable effects such as coloring of a resin, etc. occur when the sol has employed for the resin.

The antimony oxide is considerably a strong acid and forms, by the reaction with an organic base such as an amine, a bonding of Sb—OH. . . NH$_2$R or forms in certain circumstances amine antimonate.

Accordingly, if the organic base is added to the antimony pentoxide sol, depending upon the kind of the base, the surface of colloidal antimony pentoxide particle becomes hydrophobic and sediments or floats as aggregates to cause separation. In this case, an organic solvent may be added to the aggregated system and the solvent may be replaced by evaporation. However, to separate the precipitates as the wet cake and disperse the wet cake obtained in an organic solvent is preferred since it is effective in removing water. The slurry formed by separation can easily be separated by pressure (or suction) filtration, centrifugal filtration or the like. The amount of water of the wet cake obtained is 30 to 60% by weight. Of these, crystallization water of the antimony pentoxide is 5 to 15% by weight and adhered water is 15 to 55% by weight. Next, the wet cake thus formed is added in the organic solvent, dispersed and peptized, and then removed the remaining water therefrom to obtain the antimony pentoxide organosol. The separating method of water after addition of the wet cake into the hydrophilic organic solvent is to remove water with heating at ordinary pressure or under reduced pressure whereby the antimony pentoxide organosol can be obtained. The temperature at this time may preferably be at room temperature to 100° C. Also, when an alcohol is employed, it is possible to remove water by a membrane filtration using an ultrafiltration membrane, etc., but it is undesirable when the other solvent is employed.

When the hydrophobic organic solvent is employed, water can be removed by separating solutions since water and the antimony pentoxide organosol are separated into two phases.

In this invention, as the concentration of peptization in the organic solvent, it is possible in the range of 2 to 50% by weight, preferably 20 to 40% by weight, in terms of anhydrous antimony pentoxide (Sb$_2$O$_5$). In case the concentration of peptization is less than 2% by weight, productivity is not good. In case it exceeds 50% by weight, while the peptization is possible, the concentration of the solid content will likely to become 60% by weight or more whereby the viscosity is high and the peptization tends to ununiform and thus it is not preferred.

EXAMPLES

This invention will be described below in more detail by referring Examples and Comparative examples, by which the present invention is not limited. In the following Examples and Comparative examples, "%" represents "% by weight".

EXAMPLE 1

(toluene sol)

To 60 kg of acidic antimony pentoxide sol (Sb$_2$O$_5$ 12%, Na$_2$O/Sb$_2$O$_5$ molar ratio of 0.3) obtained by the ion-exchange method were added 442 g of benzylamine and 390 g of alkylbenzenesulfonic acid (Osen-5S, trade name, produced by Nissan Chemical Industries, Ltd., hereinafter referred to as "ABS acid") to prepare slurry of the antimony pentoxide gel. This slurry was filtered by suction filtration to obtain 19.5 kg (Sb$_2$O$_5$: 37%) of the wet cake of the antimony pentoxide gel. After the above wet cake was dispersed with stirring in 14.2 kg of toluene, allowed to stand and separated the upper aqueous layer to obtain toluene antimony pentoxide sol. The sol obtained had a specific gravity of 1.256; viscosity of 5.0 c.p.; composition of 31% Sb$_2$O$_5$ and 2.5% H$_2$O; benzylamine/Sb$_2$O$_5$: 6.14% and ABS acid/Sb$_2$O$_5$: 5.42%.

Further, the sol was condensed to the Sb$_2$O$_5$ concentration of 50% by an evaporator. The toluene antimony pentoxide sol obtained had a specific gravity of 1.604 and viscosity of 8 c.p., and it did not show high viscosity at a high concentration of 50%.

EXAMPLE 2

(trichloroethylene sol)

An amine in the antimony pentoxide sol obtained by the amine peptization method was removed by a cation exchange resin to prepare an acidic antimony pentoxide sol. To 3180 g of this sol (Sb$_2$O$_5$: 12% and Na$_2$O/Sb$_2$O$_5$ molar ratio of 0.3) were added 23.4 g of benzylamine and 20.7 g of ABS acid which is the same as in Example 1, and the mixture was filtered in the same manner as in Example 1. In 692 g of trichloroethylene was dispersed 866 g (Sb$_2$O$_5$: 44%) of the wet cake of the antimony pentoxide gel obtained and the cake was peptized. The separated aqueous layer was removed by separation in the same manner as in Example 1 to obtain trichloroethylene antimony pentoxide sol. The sol obtained had a specific gravity of 1.866; viscosity of 5.5 c.p.; composition of 31.4% Sb$_2$O$_5$ and 2.1% H$_2$O; bensylamine/Sb$_2$O$_5$: 6.13% and ABS acid/Sb$_2$O$_5$: 5.42%.

EXAMPLE 3

(DMF sol)

To 1015 g of an acidic antimony pentoxide sol (Sb$_2$O$_5$: 12% and Na$_2$O/Sb$_2$O$_5$ molar ratio of 0.3) obtained by the ion-exchange method were added 7.6 g of benzyl amine and 10.9 g of ABS acid. While aggregation occured, without separation, water was replaced by using 900 g of dimethylformamide (DMF) under reduced pressure to obtain DMF antimony pentoxide sol. The sol obtained had a specific gravity of 1.498; viscosity of 21.0 c.p.; composition of 39.5% Sb$_2$O$_5$ and 2.0% H$_2$O; benzylamine Sb$_2$O$_5$: 6.24% and ABS acid/Sb$_2$O$_5$: 8.95%.

EXAMPLE 4

(DMF sol)

An antimony pentoxide sol (Sb$_2$O$_5$: 12%, Na$_2$O: 1.92% and triethanolamine: 1.49%) (791.6 g) obtained by the amine peptization method was further condensed to prepare the antimony pentoxide sol having Sb$_2$O$_5$ of 52.7%. Then, 16.6 g of tartaric acid was added to the sol. In this case, no aggregation occured and water was replaced with the solvent by using 220 g of DMF under reduced pressure to obtain DMF antimony pentoxide sol. The sol obtained had a specific gravity of 1.680; viscosity of 18.5 c.p.; composition of 44.9% Sb$_2$O$_5$ and 2.0% H$_2$O; triethanolamine/Sb$_2$O$_5$: 16.0% and tartaric acid/Sb$_2$O$_5$: 17.5%.

EXAMPLE 5

(DMF sol)

Benzylamine (151.4 g) and oxalic acid dihydrate (28.6 g) were added to 20.3 kg of an acidic antimony pentoxide sol ($Sb_2O_5$: 12%, $P_2O_5$: 0.15%, $Na_2O/Sb_2O_5$ molar ratio of 0.3) obtained by the phosphoric acid peptization method. While aggregation occurred, without separation, solvent substitution was carried out by using 8 kg. of DMF under reduced pressure at 80° C. to obtain DMF antimony pentoxide sol. The sol obtained had a specific gravity of 1.750; viscosity of 19.5 c.p.; composition of 50% $Sb_2O_5$ and 1.8% $H_2O$; benzylamine/$Sb_2O_5$: 6.22% and oxalic acid/$Sb_2O_5$: 1.17%.

EXAMPLE 6

(DMF sol)

n-Propylamine (15.6 g) was added to 5.21 kg of an acidic antimony pentoxide sol ($Sb_2O_5$: 12% and $P_2O_5$: 0.15 %; $Na_2O/Sb_2O_5$ molar ratio of 0.3) obtained by the phosphoric acid peptization method and the sol was condensed to $Sb_2O_5$ of 45%. Then, 26 g of 50% lactic acid was added to the sol. In this case, no aggregation occured and it was in the state of sol. Solvent substitution of this sol (400 g) was carried out by using 1400 g of DMF. The sol obtained had a specific gravity of 1.502; viscosity of 16.5 c,p.; composition of 36.8% $Sb_2O_5$ and 2.3% $H_2O$; n-propylamine/$Sb_2O_5$: 2.5% and lactic acid/$Sb_2O_5$: 2.08%.

EXAMPLE 7

(methanol sol)

After 5.57 g of tartaric acid was added to 885 g of condensed sol ($Sb_2O_5$: 45%) obtained in Example 6, solvent substitution of the sol was carried out by using 5700 g of methanol. The methanol antimony pentoxide sol obtained had a specific gravity of 1.184; composition of 36.8% $Sb_2O_5$ and 2.3% $H_2O$; n-propylamine/$Sb_2O_5$: 2.5% and tartaric acid/$Sb_2O_5$: 1.40%.

EXAMPLE 8

(kerosine sol)

In the preparative method of antimony pentoxide sol disclosed in U.S. Pat. No. 4,589,997, peptization and condensation was carried out by using, as an organic base, n-propylamine and 405.2 g of the aqueous antimony pentoxide sol ($Sb_2O_5$: 55% and n-propylamine: 1.65%) obtained was added under stirring 280 g of kerosine. Subsequently, 6.91 g of benzylamine and 12.26 g of ABS acid were added to the sol and after allowed to stand, the aqueous layer was removed by separation to obtain kerosine antimony pentoxide sol. The sol obtained had a specific gravity of 1.124; viscosity of 2.8 c.p.; composition of 30.3% $Sb_2O_5$ and 2.5% $H_2O$; (n-propylamine +benzylamine)/$Sb_2O_5$: 6.10% and ABS acid/$Sb_2O_5$: 5.50%.

EXAMPLE 9

(isopropyl alcohol sol)

2.74 g of 75% lactic acid was added under stirring to 201.0 g of the aqueous antimony pentoxide sol ($Sb_2O_5$: 55% and di-n-propylamine: 1.54%) prepared in the same manner as in Example 8 by using, as an organic base, di-n-propylamine and then solvent substitution was carried out under reduced pressure by using 1500 g of isopropyl alcohol to obtain isopropyl alcohol antimony pentoxide sol. The sol obtained had a specific gravity of 1.130; viscosity of 10.4 c.p.; composition of 31.0% $Sb_2O_5$ and 2.5% $H_2O$; di-n-propylamine/$Sb_2O_5$: 3.00% and lactic acid/$Sb_2O_5$: 2.00%.

EXAMPLE 10

(xylene sol)

To 1.0 kg of an acidic antimony pentoxide sol ($Sb_2O_5$: 12% and $P_2O_5$: 0.15%; $Na_2O/Sb_2O_5$ molar ratio of 0.3) obtained by the phosphoric acid peptization method were added under stirring 8.3 g of β-phenethylamine and then 6.50 g of ABS acid to prepare the slurry of the antimony pentoxide gel. This slurry was filtered by suction filtration to obtain 300 g of the wet cake of antimony pentoxide gel ($Sb_2O_5$: 40%). After this cake was dispersed in 236 g of xylene and peptized, allowed to stand and the separated upper aqueous layer was removed to obtain xylene antimony pentoxide sol. The sol obtained had a specific gravity of 1.254; viscosity of 5.0 c,p.; composition of 31.0% $Sb_2O_5$ and 2.3% $H_2O$; β-phenethylamine/$Sb_2O_5$: 6.91% and ABS acid/$Sb_2O_5$: 5.41%.

EXAMPLE 11

(dimethylacetamide sol)

165 g of 50% lactic acid was added under stirring to 10 kg of the aqueous antimony pentoxide sol ($Sb_2O_5$: 50 % and n-propylamine: 1.75%) prepared in the same manner as in Example 8. No aggregation was caused and it remained the state of sol. Whole amount of this sol was subjected to solvent substitution under reduced pressure by using 5680 g of dimethylacetamide. The dimethylacetamide antimony pentoxide sol obtained had a specific gravity of 1.544; viscosity of 8.3 c.p.; composition of 40.5% $Sb_2O_5$ and 6.6% $H_2O$; n-propylamine/$Sb_2O_5$: 3.50% and lactic acid/$Sb_2O_5$: 1.65%.

EXAMPLE 12

(methylcellosolve sol)

5.28 g of 50% lactic acid was added under stirring to 320 g of the aqueous antimony pentoxide sol ($Sb_2O_5$: 50 % and n-propylamine: 1.75%) used in Example 11 and the resulting sol was subjected to solvent substitution under reduced pressure by using 390 g of methylcellosolve. The methylcellosolve antimony pentoxide sol obtained had a specific gravity of 1.371; viscosity of 4.3 c.p.; composition of 28.7% $Sb_2O_5$ and 5.0% $H_2O$; n-propylamine/$Sb_2O_5$: 3.50% and lactic acid/$Sb_2O_5$: 1.65%.

COMPARATIVE EXAMPLE 1

23.4 g of benzylamine was added to 3180 g of the acidic antimony pentoxide sol ($Sb_2O_5$: 12% and $Na_2O/Sb_2O_5$ molar ratio of 0.3) obtained by the ion-exchange method to prepare a slurry of antimony pentoxide gel. This slurry was subjected to suction filtration to obtain 840 g of the wet cake of antimony pentoxide gel. This wet cake was dispersed in 700 g of toluene but no peptization was occurred whereby no sol was obtained.

COMPARATIVE EXAMPLE 2

20.7 g of ABS acid was added to 3180 g of the acidic antimony pentoxide sol ($Sb_2O_5$: 12% and $Na_2O/Sb_2O_5$ molar ratio of 0.3) obtained by the ion-exchange method to prepare a slurry of antimony pentoxide gel. This slurry was subjected to suction filtration while filterability was remarkably bad, and 860 g of the wet cake of antimony pentoxide gel obtained was dispersed in 700 g of toluene. However, while only uniform milky white emulsion was obtained, no peptization was occurred whereby no sol was obtained.

COMPARATIVE EXAMPLE 3

23.7 g of benzylamine was added to 3180 g of antimony pentoxide sol ($Sb_2O_5$: 12%, $P_2O_5$: 0.15% and $Na_2O$: 0.75%; $Na_2O/Sb_2O_5$ molar ratio of 0.3) obtained by the phosphoric acid peptization method to form a slurry of antimony pentoxide gel. This slurry was subjected to suction filtration and 350 g of the wet cake of antimony pentoxide gel obtained was subjected to solvent substitution by using 800 g of DMF. While the water was removed, no peptization was occurred whereby no sol was obtained.

We claim:

1. A process for preparing stable colloidal sols of antimony pentoxide in organic solvents which comprises the steps of adjusting an amount of an organic base in an aqueous colloidal solution of antimony pentoxide to, in terms of % by weight, 2 to 30% based on antimony pentoxide; adding an organic acid in an amount of 0.2 to 20% by weight based on antimony pentoxide; and replacing the water dispersing medium of the colloidal solution with an organic solvent.

2. The process for preparing stable colloidal sols of antimony pentoxide in organic solvents according to claim 1, wherein said organic base is selected from the group consisting of aliphatic amines, alicyclic amines, aralkyl amines, alkanol amines and aromatic amines.

3. The process for preparing stable colloidal sols of antimony pentoxide in organic solvents according to claim 1, wherein said organic acid is selected from the group consisting of alkylbenzenesulfonic acids having $C_1$ to $C_{15}$ alkyl group; alkylnaphthalenesulfonic acids having $C_1$ to $C_{15}$ alkyl group; alkylsulfonic acids having $C_4$ to $C_{18}$ alkyl group; alkylsulfates having $C_4$ to $C_{18}$ alkyl group; alkylpolyoxyethylenesulfates having $C_4$ to $C_{18}$ alkyl group where ethyleneoxide added mole number thereof being 1 to 5; mono- or dialkylphosphates; mono- or diarylphosphates; alkylarylphosphates; polyoxyethylene adducts of the above phosphates; monocarboxylic acids having 3 to 12 carbon atoms; aliphatic dicarboxylic acids; hydroxycarboxylic acids; aromatic carboxylic acids; and acids having sulfonyl group and carboxyl group in the structure.

4. The process for preparing stable colloidal sols of antimony pentoxide in organic solvents according to claim 1, wherein said organic solvent is hydrophilic organic solvents.

5. The process for preparing stable colloidal sols of antimony pentoxide in organic solvents according to claim 4, wherein the replacing method of the dispersing medium of the sol from water to the organic solvent is carried out by heating under reduced pressure or ordinary pressure.

6. The process for preparing stable colloidal sols of antimony pentoxide in organic solvents according to claim 4, wherein said hydrophilic organic solvent is selected from the group consisting of acid amides, lower alcohols, polyvalent alcohols, glycol ethers, cyclic ethers and dimethylsulfoxide.

7. The process for preparing stable colloidal sols of antimony pentoxide in organic solvents according to claim 1, wherein said organic solvent is hydrophobic organic solvents.

8. The process for preparing stable colloidal sols of antimony pentoxide in organic solvents according to claim 7, wherein the method of replacing the dispersing medium of the sol from water to the organic solvent is carried out by separation of solutions.

9. The process for preparing stable colloidal sols of antimony pentoxide in organic solvents according to claim 7, wherein said hydrophobic organic solvent is selected from the group consisting of aromatic hydrocarbons, aliphatic hydrocarbons, alicyclic hydrocarbons, esters, halogenated hydrocarbons, ketones and ethers.

10. The process for preparing stable colloidal sols of antimony pentoxide in organic solvents according to claim 1, wherein when a gel is formed by addition of said organic base to said aqueous colloidal solution, the process comprises separating said gel, dispersing said gel in an organic solvent and removing remaining water from said gel.

* * * * *